US010377188B2

(12) United States Patent
Couppee et al.

(10) Patent No.: US 10,377,188 B2
(45) Date of Patent: Aug. 13, 2019

(54) TYRE PRESSURE REGULATING DEVICE (71) Applicant: WABCO GmbH, Hannover (DE)

(72) Inventors: Ulrich Couppee, Coppenbruegge (DE); Michael Haverkamp, Hannover (DE); Thomas Stellmacher, Stadthagen (DE)

(73) Assignee: WABCO GMBH, Hannover (DE)

( * ) Notice: Subject to any disclaimer, the term of this patent is extended or adjusted under 35 U.S.C. 154(b) by 108 days.

(21) Appl. No.: 15/541,387

(22) PCT Filed: Feb. 12, 2016

(86) PCT No.: PCT/EP2016/000245
§ 371 (c)(1),
(2) Date: Jul. 3, 2017

(87) PCT Pub. No.: WO2016/155860
PCT Pub. Date: Oct. 6, 2016

(65) Prior Publication Data
US 2017/0361665 A1 Dec. 21, 2017

(30) Foreign Application Priority Data
Apr. 2, 2015 (DE) .................. 10 2015 004 366

(51) Int. Cl.
B60C 23/00 (2006.01)
(52) U.S. Cl.
CPC .................... B60C 23/003 (2013.01)
(58) Field of Classification Search
CPC .................................................. B60C 23/003
See application file for complete search history.

(56) References Cited

U.S. PATENT DOCUMENTS

| 4,641,698 A * | 2/1987 | Bitonti .................. B60C 23/003 137/223 |
| 6,098,682 A | 8/2000 | Kis |
| 6,439,044 B1 | 8/2002 | Tigges |
| 7,963,307 B2 | 6/2011 | Rudolf et al. |

(Continued)

FOREIGN PATENT DOCUMENTS

| AT | 8904 U1 | 2/2007 |
| DE | 3105037 A1 | 9/1982 |

(Continued)

Primary Examiner — Kip T Kotter
(74) Attorney, Agent, or Firm — Leydig, Voit & Mayer, LTD.

(57) ABSTRACT

A tire pressure regulating device for adjusting, while driving, the tire pressures of vehicle wheels of a plurality of vehicle axles of a motor vehicle with pneumatic tires includes at least one switchover valve arranged on the vehicle chassis that can be controlled in an electromagnetic/pneumatic manner, a plurality of axle valves, each axle valve being arranged on the vehicle chassis for each vehicle axle and being controllable in an electromagnetic/pneumatic manner, a plurality of pressure-controlled wheel valves, each pressure-controlled wheel valve being arranged at a respective vehicle wheel, a pilot control valve arranged on the vehicle chassis and being controllable in a purely electromagnetic manner or in an electromagnetic/pneumatic manner, and a plurality of two-channel rotary couplings arranged between the vehicle axles and associated vehicle wheels and provided with switchable seals.

16 Claims, 5 Drawing Sheets (56) References Cited

U.S. PATENT DOCUMENTS

| | | | | |
|---|---|---|---|---|
| 8,136,561 | B2* | 3/2012 | Sandoni | B60C 23/003 |
| | | | | 152/415 |
| 9,662,943 | B2 | 5/2017 | Dieckmann | |
| 2006/0007007 | A1* | 1/2006 | Claussen | B60C 23/003 |
| | | | | 340/605 |
| 2009/0032158 | A1* | 2/2009 | Rudolf | B60C 23/003 |
| | | | | 152/415 |
| 2015/0360522 | A1* | 12/2015 | Dieckmann | B60C 23/003 |
| | | | | 152/417 |

FOREIGN PATENT DOCUMENTS

| | | |
|---|---|---|
| DE | 19804249 A1 | 8/1999 |
| DE | 19950191 C1 | 5/2001 |
| DE | 102004021161 B4 | 1/2008 |
| DE | 202011000352 U1 | 5/2012 |
| DE | 102012023509 A1 | 6/2014 |
| WO | WO 2007025320 A1 | 3/2007 |
| WO | WO 2012084690 A1 | 6/2012 |

* cited by examiner

Fig.5

TYRE PRESSURE REGULATING DEVICE

CROSS REFERENCE TO RELATED APPLICATIONS

This application is a U.S. National Phase application under 35 U.S.C. § 371 of International Application No. PCT/EP2016/000245 (WO 2016/155860 A1), filed on Feb. 12, 2016, and claims benefit to German Patent Application No. DE 10 2015 004 366.8, filed Apr. 2, 2015.

FIELD

The invention relates to a tyre pressure regulating device, by means of which the tyre pressures of the vehicle wheels of a plurality of vehicle axles of a motor vehicle with pneumatic tyres, e.g. an off-road machine, can be adjusted while driving.

BACKGROUND

Self driving machines, e.g. agricultural tractors and harvesting machines, which are provided for off-road use but cover relatively long distances at relatively high speed on public roads on the way to and from the locations of use, are preferably provided with a tyre pressure regulating device, by means of which the tyre pressures of the vehicle wheels can be changed, i.e. increased or lowered as required. While driving on paved roads requires a small contact area of the vehicle tyres, achieved by means of an increased tyre pressure, to achieve a low rolling resistance and good adhesion of the vehicle tyres on the roadway, a tyre pressure that is as low as possible is advantageous for off-road use, e.g. during work on a field or when harvesting wood in a forest, preventing the vehicle wheels from sinking into the soft ground and preventing unwanted compaction of the ground and increasing the traction of the driven vehicle wheels by virtue of the enlarged contact area of the vehicle wheels. Since separate compressed air sources with an adequate compressed air supply are generally unavailable, either in stationary or mobile form, modern off-road machines are increasingly being provided with a tyre pressure regulating device which, to avoid long interruptions in driving or work, are preferably designed in such a way that the tyre pressures of the vehicle wheels can be adjusted while traveling. Modern agricultural tractors, in particular, are often fitted with an air brake system, therefore, in this case, the tyre pressure regulating device can advantageously use the existing compressed air supply device of the brake system as a compressed air source.

DE 31 05 037 C2 describes a tyre pressure regulating device of a two-axle motor vehicle, in which a main connecting line which branches into two axle connecting lines can be connected via a relay valve and a shutoff valve to the filling pressure line, which is connected to a delivery pressure line of the compressed air source via a pressure limiting valve. The relay valve and the shutoff valve are of pressure-controlled design and can be controlled by means of a common pilot control valve. Arranged in each of the axle connecting lines, which each branch into two outer wheel connecting lines, is a respective pressure-controlled relay valve, which can be controlled by means of an associated pilot control valve. Those segments of the outer wheel connecting lines which are arranged on the vehicle chassis or on the vehicle axles and those which are arranged on the vehicle wheels are each connected to one another by single-channel rotary couplings. Arranged at each of the vehicle wheels is a wheel valve designed as a pressure-controlled 2/2-way switching valve, by means of which an inner wheel connecting line leading into the interior of the relevant wheel tyre can alternately be connected to the associated outer wheel connecting line or can be shut off with respect to the latter. The control lines of the wheel valves each branch off from the associated outer wheel connecting line. The filling pressure required to increase or lower the tyre pressure is set at a control valve, which is used to control a pilot control valve associated with a relay valve arranged between the filling pressure line and the main connecting line. Irrespective of whether the tyre pressure is being increased or lowered, the wheel valves open into the outer wheel connecting lines when a defined minimum pressure is reached.

Further tyre pressure regulating devices are known from DE 198 04 249 A1 and WO 2012/084690 A1. DE 10 2004 021 161 B4 describes a rotary coupling or rotary union in a tyre pressure regulating device.

SUMMARY

In an embodiment, the present invention provides a tyre pressure regulating device for adjusting, while driving, the tyre pressures of vehicle wheels of a plurality of vehicle axles of a motor vehicle with pneumatic tyres. The tyre pressure regulating device includes at least one switchover valve arranged on the vehicle chassis that can be controlled in an electromagnetic/pneumatic manner, wherein the at least one switchover valve is configured to alternately connect a main connecting line that leads to an axle valve of a vehicle axle to a pressure-carrying filling pressure line or to an unpressurized vent line. The tyre pressure regulating device also includes a plurality of axle valves, each axle valve being arranged on the vehicle chassis for each vehicle axle and being controllable in an electromagnetic/pneumatic manner, wherein each axle valve is configured to alternately connect a respective axle connecting line, which branches into outer wheel connecting lines of a respective vehicle axle, to the respective main connecting line or to shut off the respective axle connecting line with respect to the main connecting line. The tyre pressure regulating device additionally includes a plurality of pressure-controlled wheel valves, each pressure-controlled wheel valve being arranged at a respective vehicle wheel and being configured to alternately connect a respective inner wheel connecting line, which leads into an interior of a tyre of the respective vehicle wheel, to an associated outer wheel connecting line or to shut off the respective inner wheel connecting line with respect to the associated outer wheel connecting line. Furthermore, the tyre pressure regulating device also includes a pilot control valve arranged on the vehicle chassis and being controllable in a purely electromagnetic manner or in an electromagnetic/pneumatic manner, the pilot control valve being configured to alternately connect a main control line, which branches into axle control lines of the vehicle axles, to a pressure-carrying control pressure line or to a vent outlet. Finally, the tyre pressure regulating device includes a plurality of two-channel rotary couplings arranged between the vehicle axles and associated vehicle wheels and provided with switchable seals, wherein the two-channel rotary couplings are configured to transfer, in a pressure-tight manner, compressed air which is carried in the outer wheel connecting lines and the control pressure medium which is carried in wheel control lines, which branch off from the respective axle control line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A tyre pressure regulating device for a motor vehicle with pneumatic tyres is described herein that has improved operating and control properties in comparison with the known tyre pressure regulating devices.

According to an embodiment of the invention, a tyre pressure regulating device by means of which the tyre pressures of the vehicle wheels of a plurality of vehicle axles of a motor vehicle with pneumatic tyres can be adjusted while driving, has the following features: (i) at least one switchover valve, which is arranged on the vehicle chassis, can be controlled in an electromagnetic/pneumatic manner, and by means of which at least one main connecting line, which leads to an axle valve of a vehicle axle, can alternately be connected to a pressure-carrying filling pressure line or to an unpressurized vent line, (ii) an axle valve, which is arranged on the vehicle chassis for each vehicle axle, can be controlled in an electromagnetic/pneumatic manner, and by means of which an axle connecting line, which branches into outer wheel connecting lines of the relevant vehicle axle, can alternately be connected to the respective main connecting line or can be shut off with respect to the latter, (iii) a pressure-controlled wheel valve, which is arranged at each vehicle wheel and by means of which an inner wheel connecting line, which leads into the interior of the relevant wheel tyre, can alternately be connected to the associated outer wheel connecting line or can be shut off with respect to the latter, (iv) a pilot control valve, which is arranged on the vehicle chassis, can be controlled in an electromagnetic/ pneumatic manner, and by means of which a main control line, which branches into axle control lines of the vehicle axles, can alternately be connected to a pressure-carrying control pressure line or to a vent outlet, and (v) two-channel rotary couplings, which are arranged between the vehicle axles and the associated vehicle wheels, are provided with switchable seals, and via which the compressed air which is carried in the outer wheel connecting lines and the control pressure medium which is carried in wheel control lines, which branch off from the respective axle control line, are transferred in a pressure-tight manner.

In the unactuated, i.e. deenergized, rest position of the switchover valve, the connected main connecting line is usually connected to the unpressurized vent line, and therefore the tyre pressure of the vehicle wheels can then be lowered. In the actuated, i.e. energized, switching position of the switchover valve, the connected main connecting line is connected to the pressure-carrying filling pressure line, thereby enabling the tyre pressure of the vehicle wheels to be increased.

To fill and deflate the wheel tyres of the vehicle wheels, opening of the axle valves and of the wheel valves is also required. For this purpose, the axle valves of those vehicle axles, the wheel tyres of which are to be filled or deflated, are opened by actuating, i.e. energizing, the relevant axle valves and thereby connecting the relevant axle connecting lines to the main connecting line.

The axle valves of those vehicle axles at which the tyre pressures are to remain unchanged remain in their unactuated, i.e. deenergized, rest position, in which the relevant axle connecting lines are shut off with respect to the main connecting line. The wheel valves are opened by energizing and thus actuating the pilot control valve, whereby the control pressure present in the control pressure line is allowed through to the wheel valves via the main control line, the axle control lines and the wheel control lines and said valves are switched from the closed rest position into the open switching position thereof. In this case, the compressed air carried in the outer wheel connecting lines and the control pressure medium carried in the wheel control lines are transferred separately and in a pressure-tight manner via the two-channel rotary couplings, which are arranged between the vehicle axles and the associated vehicle wheels and are provided with switchable seals.

After the filling or deflation of wheel tyres, the control lines running from the pilot control valve to the wheel valves are switched to an unpressurized state by switching the pilot control valve to the rest position thereof, thereby closing the wheel valves again. After the tyre pressure has been increased, the connecting lines running from the switchover valve to the wheel valves are first of all vented by the switching of the at least one switchover valve to the rest position thereof, before the axle valves are closed. After the tyre pressure has been lowered, in contrast, the axle valves can be closed immediately. The pressure relief of the wheel control lines and of the outer wheel connecting lines outside actuating processes avoids continuous pressure of the seals on the associated sealing surfaces in the rotary couplings and hence greatly reduces the wear on said seals.

The separate construction of the connecting and control-line paths and the splitting of the switchover and shutoff functions in the connecting lines into separate control valves means that the tyre pressure regulating device according to the invention has better controllability in combination with high functional reliability. By virtue of the electromagnetic/ pneumatic actuation of the switchover valve, the axle valves and the pilot control valve, relatively small electric control currents are furthermore required for the control of these control valves.

To further improve the control properties of this tyre pressure regulating device, the wheel control valves are preferably of hydraulically controllable design, and a pneumatic/hydraulic pressure transducer, in which the effective pneumatic control pressure is converted into a hydraulic control pressure, is arranged between the pilot control valve and the main control line. By virtue of the incompressibility of the hydraulic oil now used as a control pressure medium in the axle control lines and wheel control lines, the wheel valves can be opened and closed more quickly. Moreover, the wheel control lines filled with hydraulic oil can be sealed off more simply and more effectively against leaks by the relevant seals of the rotary couplings than is the case with compressed air. Furthermore, the hydraulic oil which gets between the sealing lips of the seals and the sealing surfaces of the rotary couplings also acts as a lubricant, by means of which the wear on the seals is reduced. Instead of conventional hydraulic oil, the fluid carried in the wheel control lines can also be a mineral oil or a biodegradable oil, the latter being preferable especially in the case of off-road vehicles. To the extent that the term "hydraulic oil" is used, this term accordingly also includes a mineral oil or a biodegradable oil.

The pneumatic/hydraulic pressure transducer is preferably designed as a pressure reservoir partially filled with hydraulic oil, to which a pneumatic main control line connected to the pilot control valve is connected at the top, i.e. where the control compressed air is present in the installation position of the pressure reservoir, and to which a hydraulic main control line connected to the axle control lines is connected at the bottom, where the hydraulic oil is present.

According to another embodiment, the pilot control valve, the pressure transducer and a compensating reservoir, which is connected to the hydraulic main control line and filled with hydraulic oil and the hydraulic oil from which that escapes due to leakage is to be replaced, are combined in a control module having a pneumatic inlet port and a hydraulic outlet port, wherein the control module can be arranged as a preassemblable subassembly within the tyre pressure regulating device.

According to another embodiment, the control pressure line and the filling pressure line are connected via a pressure limiting valve to a delivery pressure line of a compressed air source. By means of the pressure limiting valve, a constant pressure is produced in the pressure lines connected on the outlet side, thereby enabling a pressure increase in the wheel tyres to be controlled in a relatively precise manner by way of the opening times of the axle and wheel valves. This constant pressure applied in the filling pressure line is lower than the pressure prevailing in the delivery pressure line, but this is only a slight disadvantage, if any, since the pressure prevailing in the delivery pressure line fluctuates depending on the instantaneous discharge of compressed air from the compressed air source.

In order to allow more rapid filling of the wheel tyres, it is also possible, as an alternative, to provide for only the control pressure line to be connected to the delivery pressure line of the compressed air source via a pressure limiting valve and for the filling pressure line to be connected directly to the delivery pressure line of the compressed air source. Owing to the pressure fluctuations in the delivery pressure line, however, control is more difficult since a particular opening time of the axle valves and wheel valves can now lead to underfilling or overfilling of the wheel tyres.

According to another alternative embodiment of the tyre pressure regulating device, by means of which more rapid filling of the wheel tyres is possible, the pilot control valve is connected to the control pressure line via a pressure limiting valve, and the control pressure line and the filling pressure line are connected directly to the delivery pressure line of the compressed air source.

In order to be able to monitor the tyre pressures present in the wheel tyres and hence avoid the overfilling thereof, at least in the two last-mentioned embodiments of the tyre pressure regulating device, a respective pressure sensor is preferably connected at least to each of the axle connecting lines.

In order to make available sufficiently large flow cross sections for filling and deflating the wheel tyres, a respective switchover valve is preferably arranged ahead of each of the axle valves.

All the switchover valves can be of electromagnetically/pneumatically controllable design and of identical construction, thereby allowing simultaneous filling of the wheel tyres on one vehicle axle and deflation of the wheel tyres on a different vehicle axle. Moreover, the identical embodiment of the switchover valves makes their production costs relatively low.

As an alternative to this, however, it is also possible to provide for only one of the switchover valves to be of electromagnetically/pneumatically controllable design, and for the remaining switchover valves to be of pneumatically controllable design and to be connected to the control unit of the first-mentioned switchover valve by a coupling control line. However, the advantage of cost savings through the elimination of the solenoid control units is set against the disadvantage of actuating the switchover valves in the same direction, as a result of which it is only possible to fill or deflate all the wheel tyres simultaneously.

However, if this control possibility is nevertheless considered to be sufficient, it is also possible to arrange a common electromagnetically/pneumatically controllable switchover valve ahead of the axle valves, said valve having correspondingly large flow cross sections.

Figure 1:
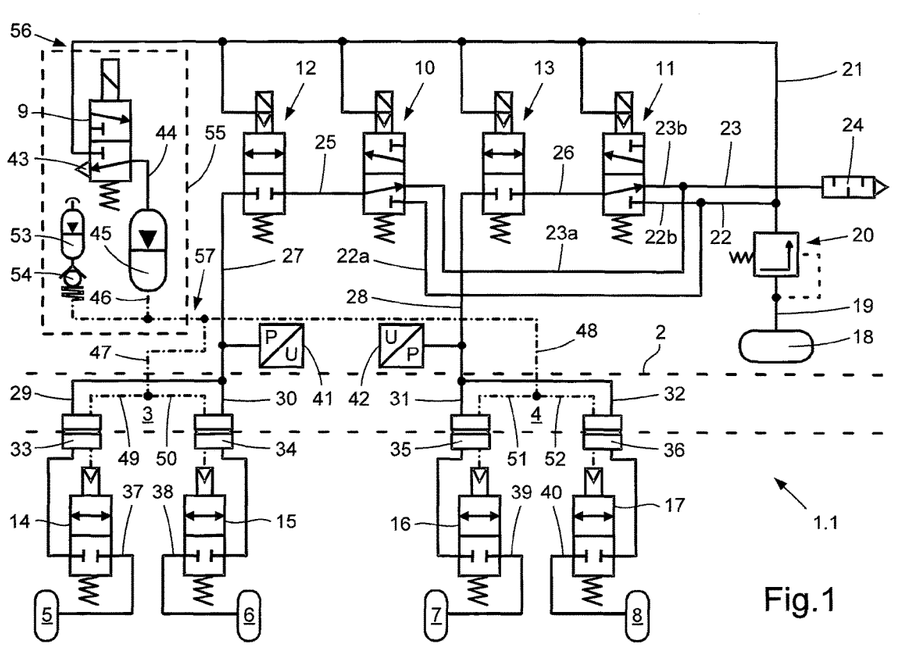
FIG. 1 shows a first embodiment of a tyre pressure regulating device according to the invention in a schematic overview.

In the schematic overview in FIG. 1, a first embodiment of a tyre pressure regulating device 1.1 according to the invention on a motor vehicle having, by way of example, two vehicle axles 3, 4, each with two vehicle wheels 5, 6; 7, 8, is depicted.

The tyre pressure regulating device 1.1 has a pilot control valve 9, two switchover valves 10, 11 and two axle valves 12, 13, which are arranged on a vehicle chassis 2 indicated by a dashed line. Moreover, the tyre pressure regulating device 1.1 includes four wheel valves 14, 15, 16, 17, which are each arranged at schematically illustrated vehicle wheels 5, 6, 7, 8 of the two vehicle axles 3, 4. The pilot control valve 9 is embodied as an electromagnetically actuable 3/2-way switching valve, the first switchover valve 10 and the second switchover valve 11 are electromagnetically/pneumatically actuable 3/2-way switching valves, and the first axle valve 12 and the second axle valve 13 are designed as electromagnetically/pneumatically actuable 2/2-way switching valves and are connected to a pressure-carrying control pressure line 21. The two switchover valves 10, 11 and the two axle valves 12, 13 are each assigned to one of the two vehicle axles 3, 4. Thus, the first switchover valve 10 and the first axle valve 12 are assigned to the front axle 3, whereas the second switchover valve 11 and the second axle valve 13 are assigned to the rear axle 4. The control valves arranged on the vehicle chassis 2, i.e. the pilot control valve 9, the two switchover valves 10, 11 and the two axle valves 12, 13, are connected in a manner known per se in terms of control engineering to an electronic control unit (not shown) by electric control lines (not depicted). The four wheel valves 14, 15, 16, 17 arranged at the four vehicle wheels 5, 6, 7, 8 are designed as pressure-controlled 2/2-way switching valves.

By means of each of the two switchover valves 10, 11, a respective main connecting line 25, 26 leading to the associated axle valve 12, 13 can alternately be connected to a first branch 22a or the second branch 22b of a pressure-carrying filling pressure line 22 or, respectively, to the first branch 23a or the second branch 23b of an unpressurized vent line 23.

In the unactuated, i.e. deenergized, state of the two switchover valves 10, 11, in which said valves are in the rest position thereof, the respective main connecting line 25, 26 is connected to the unpressurized vent line 23, which leads into the open via a muffler 24. In the actuated, i.e. deenergized, state of the two switchover valves 10, 11, in which they occupy the switching position thereof, the respective main connecting line 25, 26 is connected to the pressure-carrying filling pressure line 22.

In the present case, the control pressure line 21 and the filling pressure line 22 are connected via a pressure limiting valve 20 to a delivery pressure line 19 fed from a compressed air source 18. As a result, there is a largely constant pressure in both the control pressure line 21 and the filling pressure line 22, although this pressure is reduced relative to the pressure prevailing in the delivery pressure line 19, which is subject to fluctuations.

By means of the two axle valves 12, 13, a first axle connecting line 27 and a second axle connecting line 28, which each branch at the associated vehicle axle 3, 4 into two outer wheel connecting lines 29, 30; 31, 32, can each alternately be connected to the associated main connecting line 25, 26 or can be shut off with respect to the latter. In the unactuated, i.e. deenergized state, of the two axle valves 12, 13, in which these occupy the rest position thereof, the respective axle connecting line 27, 28 is shut off from the associated main connecting line 25, 26. In the actuated, i.e. energized state, of the two axle valves 12, 13, in which these occupy the switching position thereof, the respective axle connecting line 27, 28 is connected to the associated main connecting line 25, 26. A first pressure sensor 41 and a second pressure sensor 42, respectively, are connected to the two axle connecting lines 27, 28, said sensors being connected to the abovementioned control unit by electric sensor lines (not depicted).

The four outer wheel connecting lines 29, 30, 31, 32 are routed from the vehicle axles 3, 4 to the wheel valves 14, 15, 16, 17 arranged at the vehicle wheels 5, 6, 7, 8 via rotary couplings 33, 34, 35, 36, which are each of two-channel design and are provided with switchable seals. By means of each of the four wheel valves 14, 15, 16, 17, an inner wheel connecting line 37, 38, 39, 40 leading into the interior of the relevant vehicle wheel can alternately be connected to the associated outer wheel connecting line 29, 30, 31, 32 or can be shut off with respect to the latter. In the unactuated state of the four wheel valves 14, 15, 16, 17, i.e. the state in which no control pressure is applied, in which said valves are in the rest position thereof, the respective first to fourth inner wheel connecting line 37, 38, 39, 40 is shut off from the associated outer first to fourth wheel connecting line 29, 30, 31, 32. In the actuated state of the four wheel valves 14, 15, 16, 17, i.e. the state in which they are supplied with the control pressure, in which said valves occupy the switching position thereof, the respective inner wheel connecting line 37, 38, 39, 40 is connected to the associated outer wheel connecting line 29, 30, 31, 32.

The four wheel valves 14, 15, 16, 17 are actuated by means of the pilot control valve 9 and a pneumatic/hydraulic pressure transducer 45 arranged after said pilot control valve. By means of the pilot control valve 9, a pneumatic main control line 44 leading to the pressure transducer 45 can alternately be connected to the control pressure line 21 or to a vent outlet 43. In the unactuated, i.e. deenergized, state of the pilot control valve 9, in which said valve is in the rest position thereof, the pneumatic main control line 44 is connected to the vent outlet 43 and is thus unpressurized. In the unactuated, i.e. deenergized, state of the pilot control valve 9, in which said valve occupies the switching position thereof, the pneumatic main control line 44 is connected to the control pressure line 21 and thus carries pressure. The pressure transducer 45 is designed as a pressure reservoir and is partially filled with hydraulic oil. The pneumatic main control line 44 is connected to the pressure transducer 45 at the top, where the control compressed air is present, and a hydraulic main control line 46 is connected to the pressure transducer 45 at the bottom, where the hydraulic oil is present. In the pressure transducer 45, the pneumatic control pressure acting in the pneumatic main control line 44 is converted into a hydraulic control pressure acting in the hydraulic main control line 46.

The hydraulic main control line 46 branches into two axle control lines 47, 48 leading to the vehicle axles 3, 4. The first axle control line 47 and the second axle control line 48 each branch into two wheel control lines 49, 50; 51, 52, which are routed via the four rotary couplings 33, 34, 35, 36 to the four wheel valves 14, 15, 16, 17. To compensate hydraulic oil escaping due to leaks, a compensating reservoir 53 filled with hydraulic oil is connected via a check valve 54 to the hydraulic main control line 46. As can be seen, the compensating reservoir 53 has a bleedable filling connection at its upper end. The pilot control valve 9, the pressure transducer 45 and the compensating reservoir 53 are combined in a control module 55 having a pneumatic inlet port 56 and a hydraulic outlet port 57, wherein the control module 55 is arranged as a preassemblable subassembly within the tyre pressure regulating device 1.1.

To fill and deflate the wheel tyres, the two switchover valves 10, 11 are switched to the switching position thereof, in which the two main connecting lines 25, 26 are connected to the filling pressure line 22, or they remain in the rest position thereof, in which the two main connecting lines 25, 26 are connected to the vent line 23. The axle valves 12, 13 of those vehicle axles 3, 4 on which the wheel tyres are to be filled or deflated are then opened by actuation, i.e. energization, of the relevant axle valves 12, 13, and the relevant axle connecting lines 27, 28 are thus connected to the associated main connecting lines 25, 26. The axle valves 12, 13 of those vehicle axles 3, 4 on which the tyre pressures are to remain unchanged remain in the unactuated, i.e. deenergized, rest position thereof, in which the relevant axle connecting lines 27, 28 are shut off with respect to the associated main connecting lines 25, 26.

Moreover, all the wheel valves 14, 15, 16, 17 are opened to fill and deflate the wheel tyres. This is accomplished by actuation, i.e. energization, of the pilot control valve 9, whereby the pneumatic main control line 44 is connected to the control pressure line 21 and the control pressure present in the control pressure line 21 is allowed into the two axle control lines 47, 48 via the pneumatic main control line 44, the pressure transducer 45 and the hydraulic main control line 46 and, from said axle control lines, via the four wheel control lines 49, 50, 51, 52 and the four rotary couplings 33, 34, 35, 36 as far as the control inlets of the four wheel valves 14, 15, 16, 17. By being supplied with the control pressure, the four wheel valves 14, 15, 16, 17 are switched from the closed rest position thereof into the open switching position thereof, with the result that there is a through connection between the interiors of the wheel tyres on the vehicle axles 3, 4 and, depending on the switching position of the two switchover valves 10, 11, to the filling pressure line 22 or the vent line 23.

Since, in the present case, each vehicle axle 3, 4 is assigned a dedicated switchover valve 10, 11, the tyre pressure in the wheel tyres on the front axle 3 and on the rear axle 4 can be adjusted or changed independently of one another and also in the opposite sense. Thus, for example, the tyre pressure in the wheel tyres on the front axle 3 can be reduced by leaving the associated first switchover valve 10 in the rest position thereof, and the tyre pressure in the wheel tyres on the rear axle 4 can simultaneously be increased by switching the associated second switchover valve 11 to the switching position thereof.

The tyre pressure present in the wheel tyres on the vehicle axles 3, 4 can be detected and monitored by means of the pressure sensors 41, 42, making it possible to prevent overfilling or underfilling of the wheel tyres. By means of the two pressure sensors 41, 42, the tyre pressure present in the wheel tyres can also be checked outside adjusting processes, e.g. while traveling on a road or during a work assignment away from paved roads, by briefly opening the wheel valves 14, 15, 16, 17 with the axle valves 12, 13 closed and then detecting the pressures present in the axle connecting lines 27, 28. By means of the chosen arrangement of the pressure sensors 41, 42, these can also be used to detect leaks.

The separate construction of the connecting paths and control-line paths and the splitting of the switchover and shutoff functions in the connecting lines 25, 26, 27, 28 into separate control valves 10, 11, 12, 13 means that the tyre pressure regulating device 1.1 according to the invention has better controllability in combination with high functional reliability as compared with known tyre pressure regulating devices. By virtue of the electromagnetic/pneumatic actuation of the two switchover valves 10, 11 and the axle valves, relatively small electric control currents are furthermore required for the control of these control valves. By virtue of the incompressibility of the hydraulic oil used as a control pressure medium in the two axle control lines 47, 48 and in the four wheel control lines 49, 50, 51, 52, the four wheel valves 14, 15, 16, 17 can be opened and closed more quickly. Moreover, the wheel control lines 49, 50, 51, 52 filled with hydraulic oil can be sealed off more simply and more effectively against leaks by the relevant seals of the rotary couplings 33, 34, 35, 36 in comparison with the use of compressed air. Likewise, the hydraulic oil which gets between the sealing lips of the seals and the sealing surfaces of the rotary couplings 33, 34, 35, 36 also acts as a lubricant, by means of which the wear on the seals is reduced.

Figure 2:
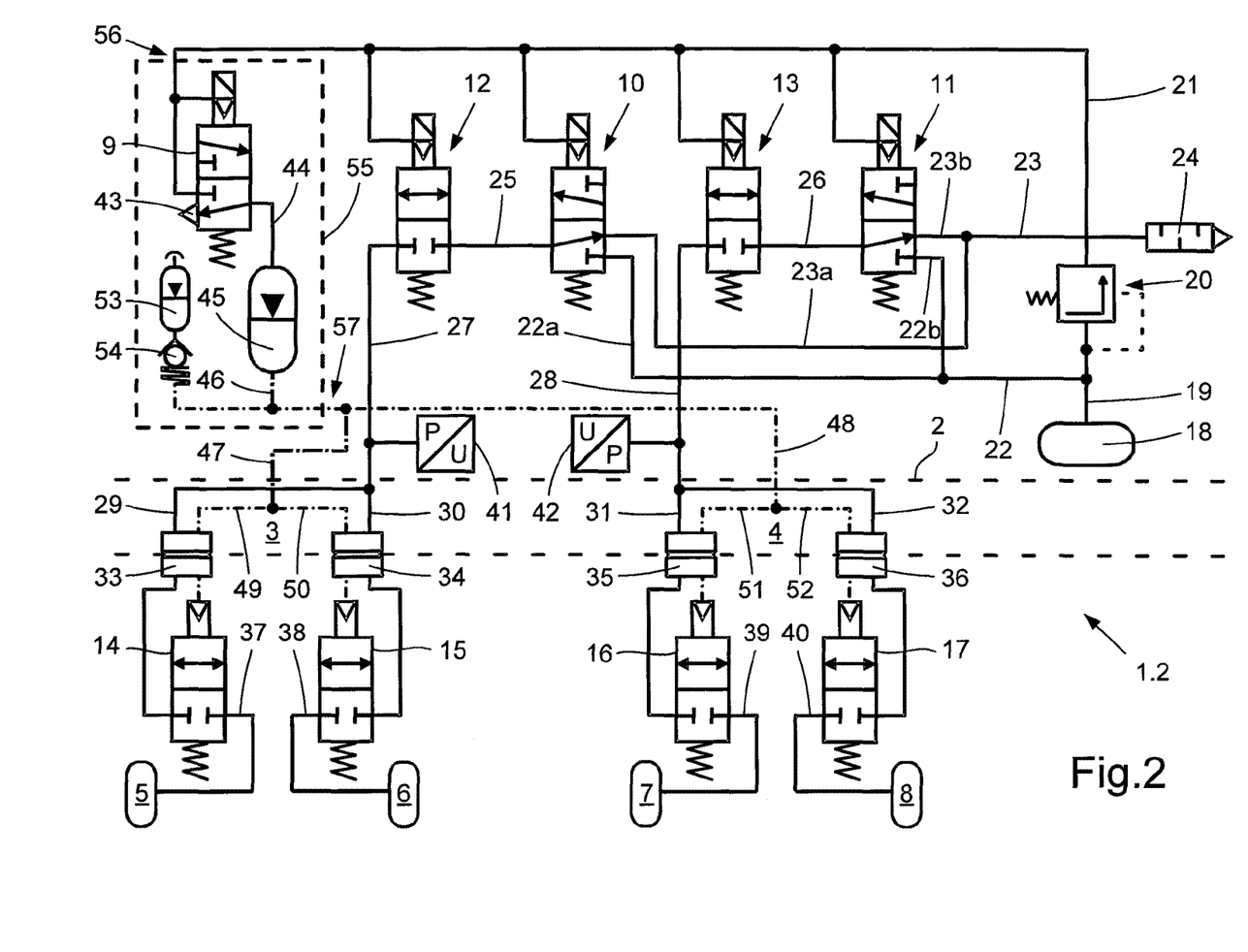
FIG. 2 shows a second embodiment of a tyre pressure regulating device in a schematic overview.

The second tyre pressure regulating device 1.2 depicted in FIG. 2 differs from the first embodiment shown in FIG. 1 in that only the control pressure line 21 is connected to the delivery pressure line 19 of the compressed air source 18 via the pressure limiting valve 20, and that the filling pressure line 22 is now connected directly to the delivery pressure line 19 of the compressed air source 18. Moreover, the pilot control valve 9 in this tyre pressure regulating device 1.2 is designed, by way of example, as an electromagnetically/pneumatically actuable 3/2-way switching valve, and therefore the pilot control valve 9 can also be switched electromagnetically with very low forces.

Owing to the higher pressure present in the delivery pressure line 19, more rapid filling of the wheel tyres, i.e. a more rapid increase in the tyre pressures of the wheel tyres, is possible. However, since the pressure prevailing in the delivery pressure line 19 can also be subject to fluctuations, depending on the level of instantaneous compressed air removal by other consuming units as well, it is expedient to monitor the tyre pressures present in the wheel tyres of the vehicle wheels 5, 6, 7, 8 by means of the two pressure sensors 41, 42 in order to avoid overfilling of the wheel tyres. However, the general mode of operation of the second tyre pressure regulating device 1.2 corresponds to that of the tyre pressure regulating device 1.1 shown in FIG. 1.

Figure 3:
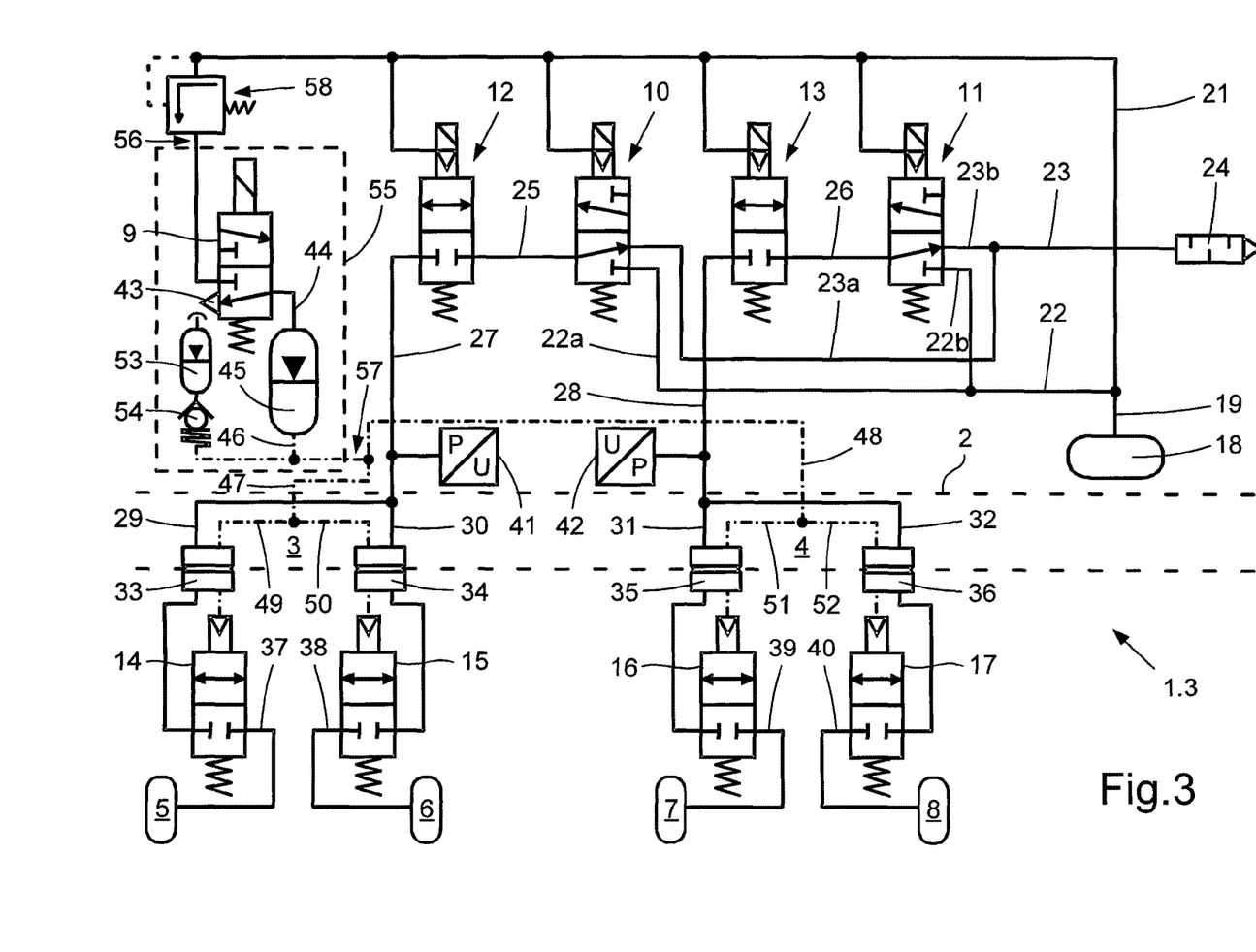
FIG. 3 shows a third embodiment of a tyre pressure regulating device in a schematic overview.

The third tyre pressure regulating device 1.3 depicted in FIG. 3 differs from the first embodiment shown in FIG. 1 and from the second embodiment shown in FIG. 2 in that the pilot control valve 9 is now connected via a pressure limiting valve 58 to the control pressure line 21, and in that the control pressure line 21 and the filling pressure line 22 are connected directly to the delivery pressure line 19 of the compressed air source 18.

In this embodiment of the tyre pressure regulating device 1.3 too, more rapid filling of the wheel tyres is possible. The pneumatic/hydraulic pressure transducer 45, which, like the rotary couplings 33, 34, 35, 36, is sensitive to pressure fluctuations, and the control inlets of the wheel valves 14, 15, 16, 17 arranged downstream thereof continue to be supplied with a constant control pressure when the pilot control valve 9 is open by virtue of the upstream pressure limiting valve 58. In contrast, the control inlets of the two switchover valves 10, 11 and of the two axle valves 12, 13 are now supplied directly with the higher pressure prevailing in the delivery pressure line 19, which is subject to fluctuations. However, the general mode of operation of the third embodiment of the tyre pressure regulating device 1.3 corresponds to that of the tyre pressure regulating device 1.1 shown in FIG. 1 and the tyre pressure regulating device 1.2 shown in FIG. 2.

Figure 4:
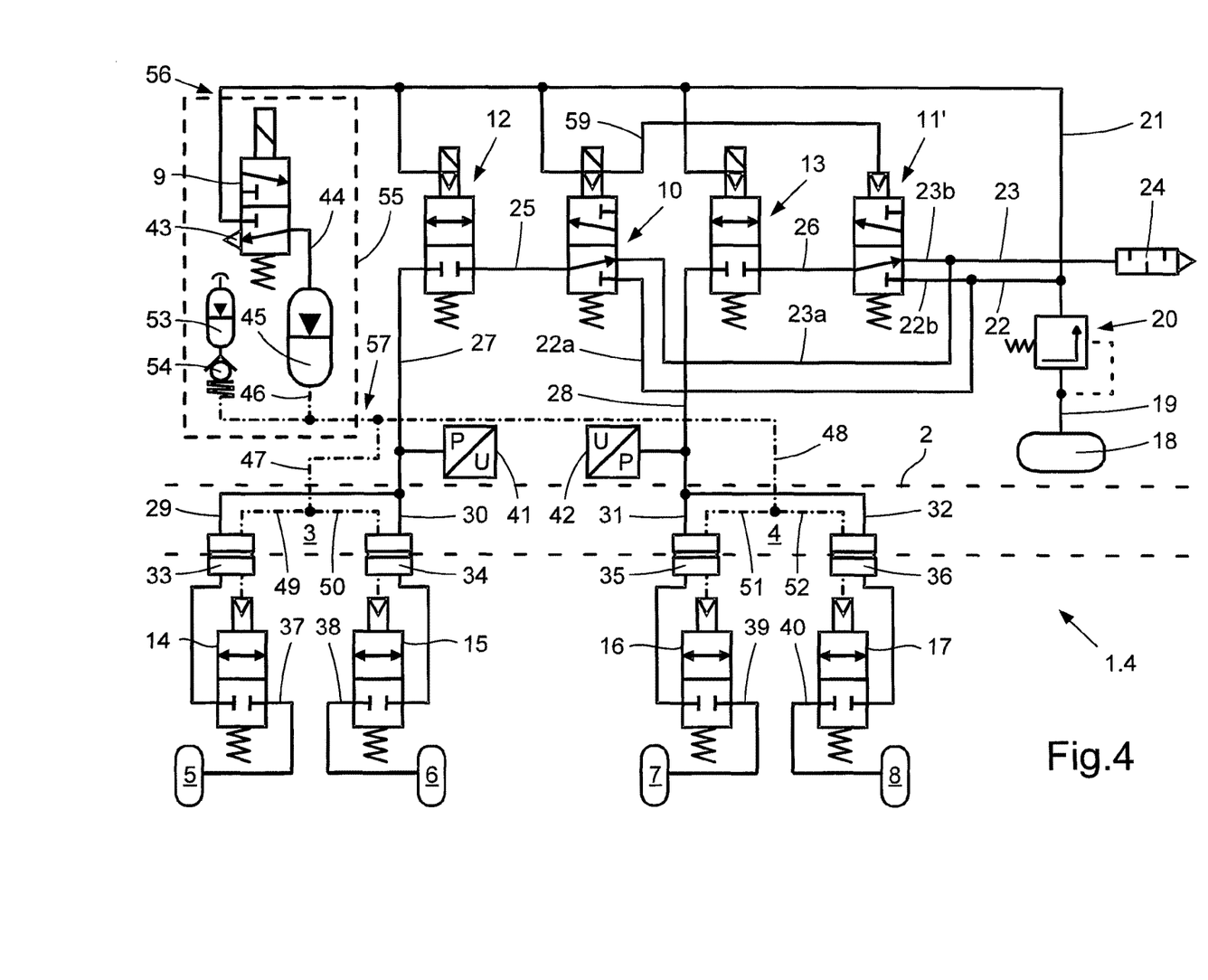
FIG. 4 shows a fourth embodiment of a tyre pressure regulating device in a schematic overview.

The fourth embodiment of a tyre pressure regulating device 1.4 according to the invention, which is depicted in a schematic overview in FIG. 4, differs from the first tyre pressure regulating device shown in FIG. 1 in that the second switchover valve 11' assigned to the rear axle 4 is now designed as a purely pneumatically controllable 3/2-way switching valve, the control inlet of which is connected by a coupling control line 59 to the control unit of the first switchover valve 10 assigned to the front axle 3.

In this tyre pressure regulating device 1.4, the second switchover valve 11' is thereby controlled in the same sense by the first switchover valve 10, with the result that both main connecting lines 25, 26 are connected either to the filling pressure line 22 or to the vent line 23, depending on the switching position of the first switchover valve 10. Thus, in this tyre pressure regulating device 1.4, only the simultaneous raising or lowering of the tyre pressures at the four vehicle wheels 5, 6, 7, 8 on the two vehicle axles 2, 3 is possible. However, the remaining range of functions of the tyre pressure regulating device 1.4 corresponds to that of the above-described three tyre pressure regulating devices 1.1, 1.2, 1.3 shown in FIGS. 1 to 3.

Figure 5:
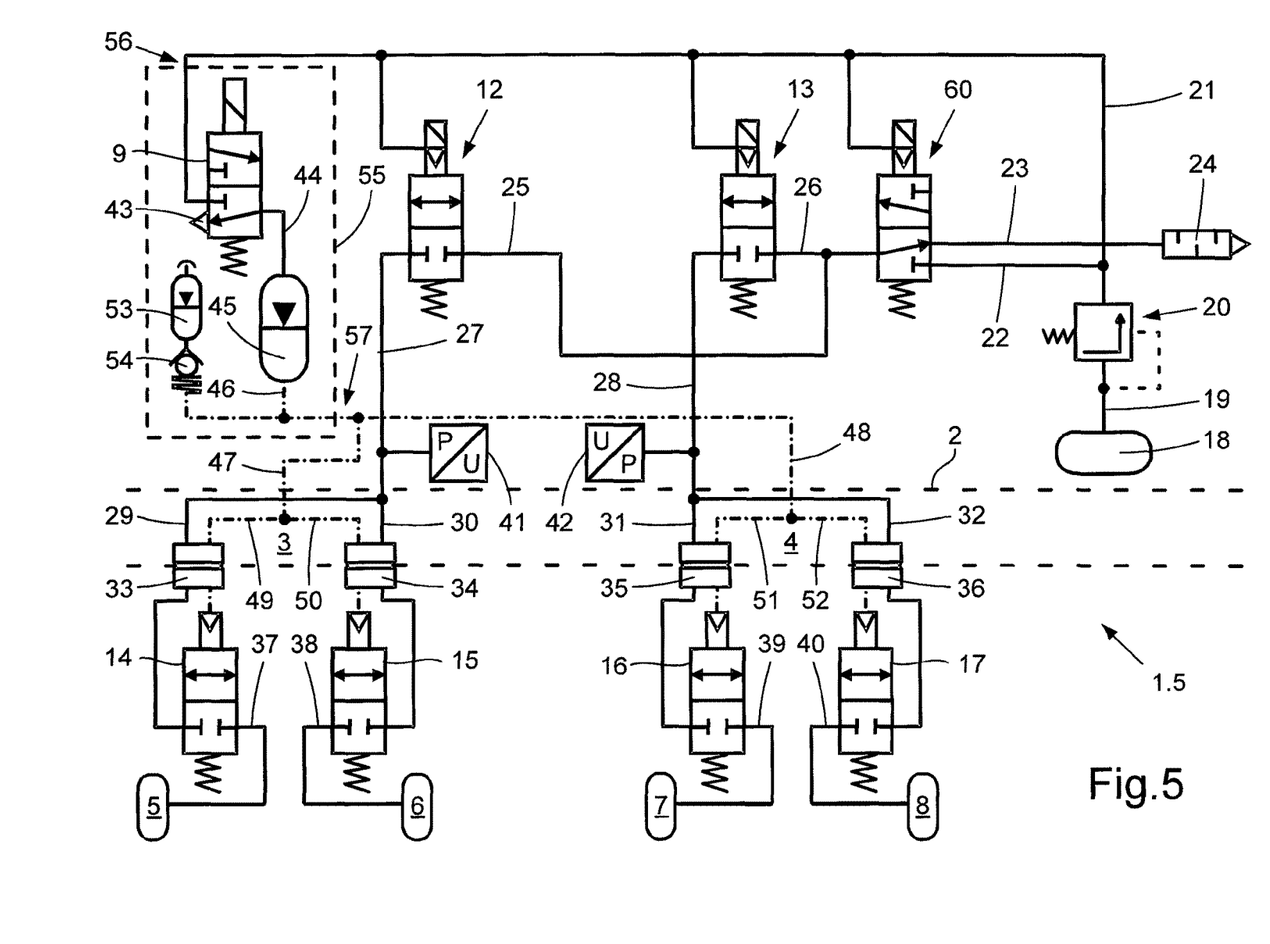
FIG. 5 shows a fifth embodiment of a tyre pressure regulating device in a schematic overview.

A fifth tyre pressure regulating device 1.5, which is depicted in FIG. 5, differs from the first tyre pressure regulating device shown in FIG. 1 and the fourth tyre pressure regulating device shown in FIG. 4 in that now only a single switchover valve 60 is provided, which is designed as an electromagnetically/pneumatically controllable 3/2-way switching valve and by means of which the two combined main connecting lines 25, 26 can alternately be connected to the filling pressure line 22 or to the vent line 23. In order to enable rapid filling or deflation of the wheel tyres, the switchover valve 60 has correspondingly larger flow cross sections than the switchover valves 10, 11, 11' in the above-described embodiments of the tyre pressure regulating devices 1.1, 1.2, 1.3, 1.4. The range of functions of the fifth tyre pressure regulating device 1.5 corresponds exactly to that of the fourth tyre pressure regulating device 1.4 shown in FIG. 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1.1 tyre pressure regulating device according to the first embodiment
1.2 tyre pressure regulating device according to the second embodiment
1.3 tyre pressure regulating device according to the third embodiment
1.4 tyre pressure regulating device according to the fourth embodiment
1.5 tyre pressure regulating device according to the fifth embodiment
2 vehicle chassis
3 vehicle axle, front axle
4 vehicle axle, rear axle
5 vehicle wheel, front left-hand wheel
6 vehicle wheel, front right-hand wheel
7 vehicle wheel, rear left-hand wheel
8 vehicle wheel, rear right-hand wheel
9 pilot control valve
10 first switchover valve
11, 11' second switchover valve
12 first axle valve
13 second axle valve
14 first wheel valve
15 second wheel valve
16 third wheel valve
17 fourth wheel valve
18 compressed air source
19 delivery pressure line
20 pressure limiting valve
21 control pressure line
22 filling pressure line
22a first branch of the filling pressure line
22b second branch of the filling pressure line
23 vent line
23a first branch of the vent line
23b second branch of the vent line
24 muffler
25 first main connecting line
26 second main connecting line
27 first axle connecting line
28 second axle connecting line
29 first outer wheel connecting line
30 second outer wheel connecting line
31 third outer wheel connecting line
32 fourth outer wheel connecting line
33 first rotary coupling
34 second rotary coupling
35 third rotary coupling
36 fourth rotary coupling
37 first inner wheel connecting line
38 second inner wheel connecting line
39 third inner wheel connecting line
40 fourth inner wheel connecting line
41 first pressure sensor
42 second pressure sensor
43 vent outlet
44 pneumatic main control line
45 pressure transducer
46 hydraulic main control line
47 first axle control line
48 second axle control line
49 first wheel control line
50 second wheel control line
51 third wheel control line
52 fourth wheel control line
53 compensating reservoir
54 check valve
55 control module
56 pneumatic inlet port
57 hydraulic outlet port
58 pressure limiting valve
59 coupling control line
60 switchover valve

The invention claimed is:

1. A tyre pressure regulating device for adjusting, while driving, tyre pressures of vehicle wheels of a plurality of vehicle axles of a motor vehicle with pneumatic tyres, the tyre pressure regulating device comprising:
a switchover valve arranged on a vehicle chassis that can be controlled in an electromagnetic/pneumatic manner, wherein the switchover valve is configured to alternately connect a main connecting line that leads to an axle valve of a first vehicle axle to a pressure-carrying filling pressure line or to an unpressurized vent line;
the axle valve, which is arranged on the vehicle chassis for the first vehicle axle and is controllable in an electromagnetic/pneumatic manner, wherein the axle valve is configured to alternately connect an axle connecting line, which branches into outer wheel connecting lines of the first vehicle axle, to the respective main connecting line or to shut off the axle connecting line with respect to the main connecting line;
a plurality of pressure-controlled wheel valves, each pressure-controlled wheel valve being arranged at a respective vehicle wheel and being configured to alternately connect a respective inner wheel connecting line, which leads into an interior of a tyre of the respective vehicle wheel, to an associated outer wheel connecting line or to shut off the respective inner wheel connecting line with respect to the associated outer wheel connecting line;
a pilot control valve arranged on the vehicle chassis and being controllable in a purely electromagnetic manner or in an electromagnetic/pneumatic manner, the pilot control valve being configured to alternately connect a main control line, which branches into an axle control line of the first vehicle axle, to a pressure-carrying control pressure line or to a vent outlet; and a plurality of two-channel rotary couplings arranged between the first vehicle axle and associated vehicle wheels and provided with switchable seals, wherein the two-channel rotary couplings are configured to transfer, in a pressure-tight manner, compressed air which is carried in the outer wheel connecting lines and the control pressure medium which is carried in wheel control lines, which branch off from the respective axle control line.

2. The tyre pressure regulating device as claimed in claim 1, wherein the wheel control valves are of a hydraulically controllable design, and wherein a pneumatic/hydraulic pressure transducer, in which the effective pneumatic control pressure is converted into a hydraulic control pressure, is arranged between the pilot control valve and the axle control line of the first vehicle axle.

3. The tyre pressure regulating device as claimed in claim 2, wherein the pneumatic/hydraulic pressure transducer is designed as a pressure reservoir partially filled with hydraulic oil, to which the main control line connected to the pilot control valve is connected at a top side, and to which a hydraulic control line connected to the axle control lines is connected at a bottom side.

4. The tyre pressure regulating device as claimed in claim 2, wherein the pilot control valve, the pressure transducer and a compensating reservoir connected to the hydraulic control line and filled with hydraulic oil are combined in a control module having a pneumatic inlet port and a hydraulic outlet port.

5. The tyre pressure regulating device as claimed in claim 1, wherein the control pressure line and the filling pressure line are connected via a pressure limiting valve to a delivery pressure line of a compressed air source.

6. The tyre pressure regulating device as claimed in claim 1, wherein the control pressure line is connected to the delivery pressure line of the compressed air source via a pressure limiting valve, and wherein the filling pressure line is connected directly to the delivery pressure line of the compressed air source.

7. The tyre pressure regulating device as claimed in claim 1, wherein the pilot control valve is connected to the control pressure line via a pressure limiting valve, and the control pressure line and the filling pressure line are connected directly to the delivery pressure line of the compressed air source.

8. The tyre pressure regulating device as claimed in claim 1, wherein a pressure sensor is connected to the axle connecting line.

9. The tyre pressure regulating device as claimed in claim 1, wherein the switchover valve is arranged ahead of the axle valve.

10. The tyre pressure regulating device as claimed in claim 1, further comprising a second axle valve arranged on the vehicle chassis for a second vehicle axle and controllable in an electromagnetic/pneumatic manner, wherein the main connecting line leads to the second axle valve of the second vehicle axle, and wherein the second axle valve is configured to alternately connect a second axle connecting line, which branches into outer wheel connecting lines of the second vehicle axle, to the main connecting line or shut off the second axle connecting line with respect to the main connecting line.

11. The tyre pressure regulating device as claimed in claim 10, wherein the switchover valve is arranged ahead of the axle valve and the second axle valve.

12. The tyre pressure regulating device as claimed in claim 11, wherein the switchover valve has a larger flow cross section than the axle valve and the second axle valve.

13. The tyre pressure regulating device as claimed in claim 1, further comprising a second axle valve arranged on the vehicle chassis for a second vehicle axle and controllable in an electromagnetic/pneumatic manner, wherein the second axle valve is configured to alternately connect a second axle connecting line, which branches into outer wheel connecting lines of the second vehicle axle, to a second main connecting line or shut off the second axle connecting line with respect to the second main connecting line, and wherein the second main connecting line leads to the second axle valve of the second vehicle axle.

14. The tyre pressure regulating device as claimed in claim 13, further comprising a second switchover valve arranged on the vehicle chassis, wherein the second switchover valve is configured to alternately connect the second main connecting line to the pressure-carrying filling pressure line or to the unpressurized vent line.

15. The tyre pressure regulating device as claimed in claim 14, wherein all the switchover valves are of electromagnetically/pneumatically controllable design and are of identical construction.

16. The tyre pressure regulating device as claimed in claim 14, wherein only one of the switchover valve and the second switchover valve is of electromagnetically/pneumatically controllable design, and wherein the other of the switchover valve and the second switchover valve is of pneumatically controllable design and is connected to a control unit of the electromagnetically/pneumatically controllable switchover valve by a coupling control line.

* * * * *